United States Patent [19]

Weidinger

[11] Patent Number: 5,636,721

[45] Date of Patent: Jun. 10, 1997

[54] MOTOR VEHICLE FRICTION CLUTCH WITH A TRANSMISSION ELEMENT MOUNTED ON AN AXIAL GUIDE

[75] Inventor: Reinhold Weidinger, Unterspiesheim, Germany

[73] Assignee: Fichtel & Sachs AG, Schweinfurt, Germany

[21] Appl. No.: 390,069

[22] Filed: Feb. 17, 1995

[30] Foreign Application Priority Data

Feb. 19, 1994 [DE] Germany ............. 44 05 344.4

[51] Int. Cl.⁶ ............................................. F16D 13/50
[52] U.S. Cl. ............................ 192/70.27; 192/70.25; 192/89.23; 192/70.28
[58] Field of Search ................ 192/70.27, 70.25, 192/89.23, 89.24, 70.28, 70.29

[56] References Cited

U.S. PATENT DOCUMENTS

| 2,009,558 | 7/1935 | Meyer | 192/70.29 X |
| 5,367,920 | 11/1994 | Bonfilio | 192/70.27 X |
| 5,385,224 | 1/1995 | Uehara | 192/70.27 X |
| 5,400,887 | 3/1995 | Mizukami et al. | 192/70.27 X |
| 5,409,091 | 4/1995 | Reik et al. | 192/89.23 X |

FOREIGN PATENT DOCUMENTS

| 4239289 | 5/1993 | Germany. |
| 4326501 | 2/1994 | Germany. |
| 0694105 | 7/1953 | United Kingdom. |
| 2144496 | 3/1985 | United Kingdom. |
| 2227060 | 7/1990 | United Kingdom. |
| 2273751 | 6/1994 | United Kingdom. |
| 2280001 | 1/1995 | United Kingdom. |

*Primary Examiner*—Andrea L. Pitts
*Attorney, Agent, or Firm*—Nils H. Ljungman and Associates

[57] ABSTRACT

A motor vehicle friction clutch with a pressure plate which is fastened with the interposition of a clutch disc with friction linings to a flywheel, and which has a common axis of rotation with the flywheel, comprising an application plate located non-rotationally—but so that it can move axially—in a clutch housing, and an application means to apply the application force, is designed so that the amount of work which must be performed by an application means for the engagement and release of the clutch becomes minimal. For this purpose, the clutch housing is provided with an axial guide for a transmission element located between the application means and the application plate, on which the transmission element, as long as there is a separation between the application plate and the friction linings of the clutch disc during an engagement and release movement, can track the movement of the application plate, while as soon as the application plate comes into contact with the friction linings of the clutch disc, the application plate can be clamped fast by means of a change in the angle initiated at its contact point with the application plate for the transmission of the application force, with the formation of a lever arm between this contact point and the engagement point of the application means on the axial guide.

7 Claims, 4 Drawing Sheets

MOTOR VEHICLE FRICTION CLUTCH WITH A TRANSMISSION ELEMENT MOUNTED ON AN AXIAL GUIDE

BACKGROUND OF THE INVENTION

1. Field of the Invention

This invention relates to a friction clutch.

2. Background Information

On some motor vehicle friction clutches as shown in FIG. 2 in German Patent No. 42 39 289 A1 (not prior art), the pressure plate is fastened to a flywheel with the interposition of a clutch disc with friction linings and lining springs, whereby the pressure plate and the flywheel have a common axis of rotation. The pressure plate is provided with an application plate located non-rotationally—but so that it can move axially—in a clutch housing, and is provided with a membrane spring which acts as an application means, whereby the membrane spring is connected to studs or pins fastened to the clutch housing. To release the clutch, a release mechanism is placed in contact with the radially inner ends of flexible tabs of the membrane spring, on its side facing away from the application plate. When the release mechanism is displaced from its initial position toward the application plate, the flexible tabs of the membrane spring are deformed so that their ends are moved radially outside the studs of the application plate, whereby first the application force exerted by the application plate on the friction lining of the clutch disc is reduced to zero, and then the application plate, assisted by the action of leaf springs located in the circumferential area and connecting the application plate to the clutch housing, is pushed away from the clutch disc. Conversely, to engage the clutch, the membrane springs are relaxed and displaced by the release mechanism, while it, the membrane spring, is relaxed, first to apply the application plate against the friction lining of the clutch disc, and then, upon further relaxation, to apply the application force. Since the membrane spring experiences a deformation both during the application/removal of the application force and during the displacement of the application plate relative to the clutch disc, its deformation resistance must be overcome during the entire release and engagement process. The amount of work which must be performed is therefore relatively high.

During the clutch release and engagement process, along the entire deformation travel of the membrane spring, a translation or translation ratio is applied which is a function of the distance between the release mechanism and the studs in relation to the distance between the latter, the studs and the point of contact of the membrane spring with the application plate. On account of the length of the deformation travel of the membrane spring, the translation which can be achieved with such pressure plates is limited, generally to approximately 3:1, so that the amount of force which must be applied to the release mechanism, called the release force below, is relatively high. On a friction clutch of the prior art, therefore, it would be helpful if, during the release, the lining springs on the clutch disc would effect a gradual reduction of the transmissible torque by a reduction of the application force. By maintaining a constant position of the membrane spring in the clutch housing by means of an adjustment device, provisions would be made so that the application force, and thus by means of the above-mentioned translation, the release force does not increase further when the friction linings are worn.

OBJECT OF THE INVENTION

The object of the invention is to design a friction clutch of the type described above so that both the force and the amount of work required for engagement and release are minimized.

SUMMARY OF THE INVENTION

The invention teaches that this object can be accomplished by the following features: wherein the clutch housing is provided with an axial guide for a transmission element which is located between the application means and the application plate, on which the transmission element, as long as there is no transmission of an application force between the application plate and the friction linings of the clutch disc during an engagement and release movement, can track the movement of an engagement and release mechanism, while as soon as it, the application plate, comes in contact with the friction linings of the clutch disc for the transmission of the application force, it can track by means of a deformation the movement of the engagement and release mechanism at its contact point with the application plate with a translation which, after the generation of a clamping connection between the transmission element and the axial guide, is a function of the distance between the point of engagement of the application means on the transmission element and the contact point of the transmission element with the application plate in relation to the distance between this contact point and the clamping connection of the transmission element on the axial guide. Because the transmission element is movably mounted on an axial guide of the clutch housing, the invention teaches that in a first movement segment in which the application plate is moved toward the clutch disc, but does not yet transmit any application force to the clutch disc, the transmission element can be displaced parallel to itself. That element of the friction clutch which the invention teaches is used to transmit the application force of the application means, for example of a membrane sprang of an engagement mechanism, to the application plate, makes possible an axial displacement of the application plate without having to overcome a deformation resistance. The amount of work performed in this movement segment is therefore insignificant.

In a second movement segment, in which the application plate must be brought into contact with the friction lining of the clutch disc and the application force must be transmitted, the transmission element is deformed in the manner described above. The movement of an engagement or release mechanism is now no longer—as in the first movement segment—transmitted with the translation 1:1 to the transmission element which can move along the axial guide, but effects a translation which is a function of the distance between the application means such as a membrane spring or an engagement mechanism and that point at which the clamping connection of the transmission element with the clutch housing occurs, in relation to the distance between the clamping connection point and the point of contact between the transmission element and the application plate. On account of the short length of the second movement segment, which equals the deformation travel on the friction lining of the clutch disc, this translation can be more than twice as high as in pressure plates of the prior art, and can reach values between 6:1 and 7:1. These translations can change slightly when the lining on the clutch disc is resilient, but a resilient lining has no influence on the theoretical result. On account of the large translation, to transmit a specified application force to the application plate, a release or engagement mechanism can be used whose potential force is approximately one-half that of comparable conventional devices. For example, when an actuator is used with the engagement or release mechanism, it can be designed with much more compact dimensions and will thus be much more economical, or on trucks, a lower-powered servo-assist can be used for the engagement or release, or such a servo-assist can even be eliminated altogether.

The amount of work to be performed, since it is a function of the level of the application force and of the size of the second movement segment, and since the latter is very small corresponding to the extremely small deformation on the friction lining and the resilience of the lining, is negligible. Accordingly, no significant work needs to be performed for the engagement and release process.

The following discloses a very simple axial guide in which the transmission element can be displaced on studs: wherein the axial guide is formed by these studs which are engaged in recesses of the transmission element. On account of the presence of the springs, wherein the studs are each surrounded by a spring which keeps the transmission element in contact with the application plate and is supported on the clutch housing, a force is always exerted on the transmission element toward the application plate. This multiplicity of individual springs can be eliminated if the applications means are formed by a membrane spring, wherein the application means are formed by a membrane spring which is located between the clutch housing and the transmission element.

Also disclosed is an embodiment by means of which, as soon as the application plate has reached the friction lining of the clutch disc, the stud is very reliably tilted or chocked or jammed in the hole of the clutch housing, since the tilting is effected by means of a lever supported by the stud in question, wherein the studs are mounted in the clutch housing so that they can move in the axial direction and support a lever, by means of which they can be tilted when acted on by the transmission element in the respective bearing.

Also disclosed is an advantageous embodiment wherein the transmission element is formed by a membrane disc, which comes into contact with one side against a shoulder of the application plate, which shoulder acts as a contact point, and with its other side is supported by means of the at least one spring on the clutch housing, which spring corresponds to the studs of the axial guide. This is an advantageous embodiment for the transmission element, since a membrane disc which is located between the application plate and an engagement mechanism and acts, for example, as an application means, can be inserted with sufficient natural or inherent or bias or prestress into the clutch housing, to push the engagement mechanism back into its initial position, after the forces acting on it have been neutralized.

Also disclosed are stops wherein the application plate is configured in the circumferential area with energy storing devices which act on the clutch housing to press against the transmission element, and has at least one stop on its side facing the transmission element, next to each of the studs. The purpose of the stops disclosed above is to prevent the transmission element from being deformed when it is in a non-positive connection with the application plate. Therefore, for a torque-free support of the transmission element the stops are located as close as possible next to the corresponding studs. By means of the energy storing device, the application plate is released from the friction lining of the clutch disc, taking the transmission element along with it.

The action of the energy storing device is also disclosed, wherein the application plate is held in contact against the stop by means of a retaining means against the action of an energy storing device which pushes the application plate away from the clutch housing and is engaged in the circumferential area with the application plate. This is in contrast to the action disclosed above, so that during release of the clutch, there is a forced clearing of the application plate with respect to the transmission element. The purpose of this measure is to counteract vibrations of the application plate when it has been released, preferably when the stress on it has been removed. The magnitude of the excursion can be limited by the retaining means.

Also disclosed is a motor vehicle friction clutch with an arrangement which includes the lining springs on the clutch disc, which arrangement, during the release process, by means of a portion of the actuation distance of the engagement and release mechanism, effects a gradual decrease of the torque transmitted by the friction clutch or the clutch disc, characterized by the fact that the transmission element, as a result of its location on the axial guide and pressurization by means of at least one spring toward the application plate, with respect to its travel during each engagement process, can be once again adjusted to the current thickness of the friction linings and of the resilience of the lining on the clutch disc. As described above, a change in the thickness of the friction linings which results in an axial displacement of the application plate with respect to the clutch housing does not have any adverse effect on the pressure plate claimed by the invention, since the transmission element, on account of its location on the axial guide, is displaced by the at least one spring during each engagement process, which always drives the application toward the clutch disc until it comes to a stop in contact with the friction lining of the clutch disc. Consequently, since there is an automatic "readjustment" during each engagement process, a separate adjustment mechanism in the sense disclosed by German Patent No. 42 39 289 A1 becomes unnecessary, because on account of the large translation ratio which can be achieved with the configuration of the pressure plate taught by the invention and which requires only a small or low force for engagement or release, a slight increase in the application force, and thus in the engagement or release force; as a function of the wear is acceptable, so that the second function of the separate adjustment device disclosed by the above-referenced prior art, namely to achieve a constant position of the membrane spring inside the clutch housing, to guarantee that the application force is independent of the wear of the friction linings on the clutch disc, is also unnecessary.

The tracking capability of the engagement and release mechanism with regard to the transmission element in the axial direction can be easily realized by means of a common hydraulic engagement or release mechanism, since the latter, if the clutch point or coupling point has been displaced when there is a change in the stroke of the transmission element in the axial direction, can draw the missing amount of hydraulic fluid from a compensation vessel.

Also disclosed is an engagement mechanism wherein the application means are formed by an engagement mechanism which acts on the transmission element, and in which the travel can be adjusted to the respective movement segment of the transmission element. When the engagement mechanism, as disclosed above, is designed as an application means, the membrane spring can be eliminated.

BRIEF DESCRIPTION OF THE DRAWINGS

Embodiments of the invention are explained in greater detail below, with reference to the accompanying drawings.

DESCRIPTION OF THE PREFERRED EMBODIMENT

Figure 1:
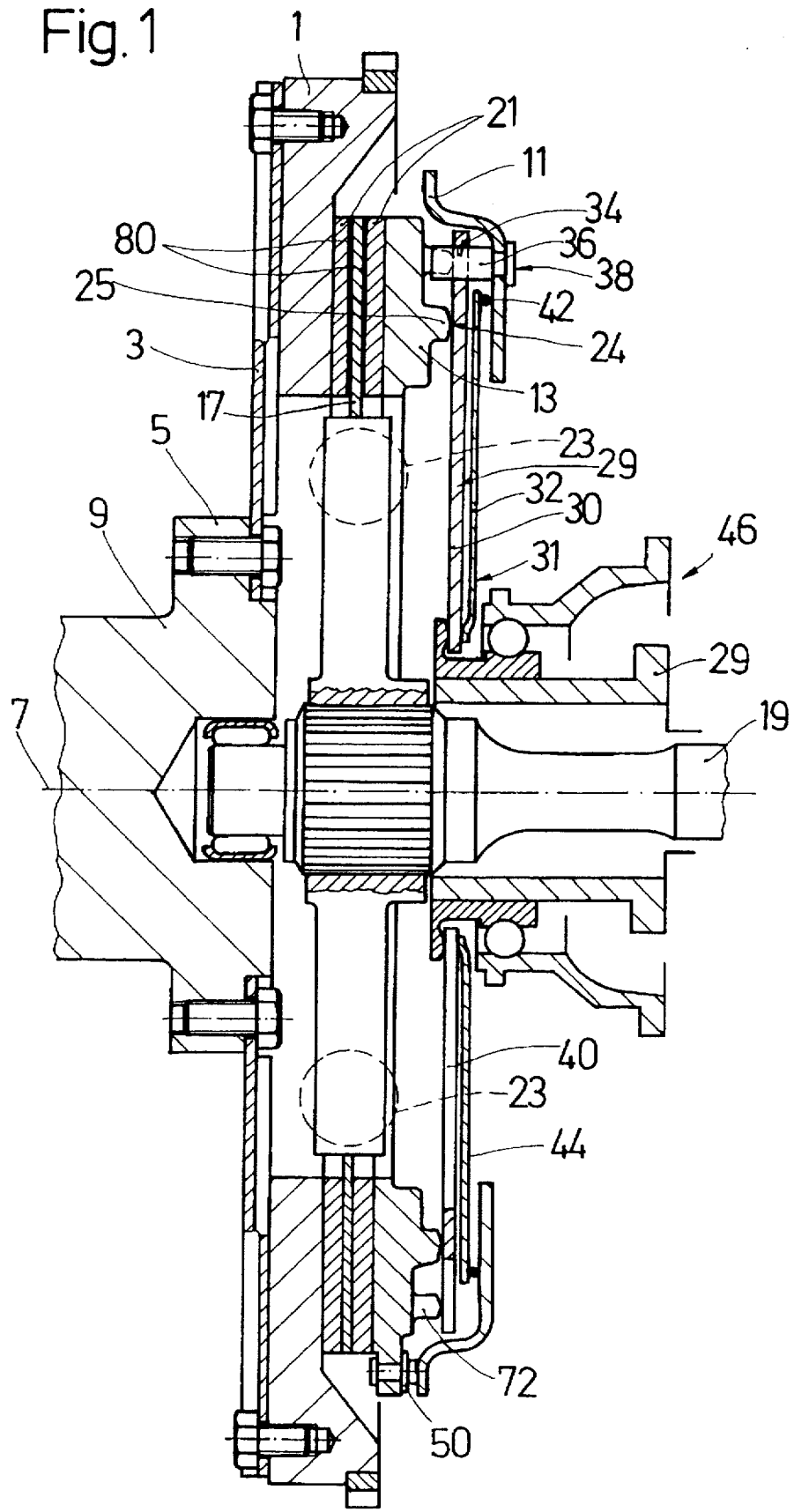
FIG. 1 and 1a show an axial longitudinal section through a motor vehicle friction clutch, which is illustrated with an application plate, a transmission element in the clutch housing, a membrane and a release mechanism which exerts tension.

The motor vehicle friction clutch illustrated in FIG. 1 comprises a flywheel 1 which is equiaxially fastened by means of a sheet metal disc 3 to a flange 5 of a crankshaft 9 of an internal combustion engine, whereby the crankshaft 9 rotates around an axis of rotation 7. The flywheel, in the manner of the prior art and therefore not described in any further detail, supports an essentially ring-shaped clutch housing 11 which, on the side of the flywheel 1 facing away from the crankshaft 9, encloses an application plate 13 which is essentially in the shape of an annular disc. The application plate is guided in the circumferential direction non-rotationally, but so that it be displaced axially on the clutch housing 11. Axially between the flywheel 1 and the application plate 13, coaxial with the axis of rotation 7, there is a clutch disc 17 which can be displaced axially in the conventional manner, but is coupled non-rotationally to an input shaft 19 of a transmission which is not shown in any greater detail. This clutch disc 17 supports friction linings 21 with lining springs 80 and can include torsional vibration dampers 23 as well as frictional vibration dampers not shown in any greater detail.

Between the clutch housing 11 on the one side and the application plate 13 on the other side, there are a membrane disc 30 which acts as a transmission element 20, and a membrane spring 32 which acts as the application means 31, whereby the membrane disc 30, in the radially outer area, has recesses 34 which are used for the passage of studs 36 which are fastened to the clutch housing 11 and extend in the axial direction of the pressure plate, and the membrane disc is movably mounted by means of these recesses on the studs 36, which are part of an axial guidance 38 for the membrane disc 30. The membrane disc 30, which has tabs 40 which extend radially inward, comes into contact with its opposite side against stops 25 of the application plate 13 which function as contact points 24.

The membrane spring 32 is braced between the membrane disc 30 and a wire ring 42 which surrounds the axis of rotation 7, and which is in contact with the corresponding side of the clutch housing 11, and presses the tabs 40 of the membrane disc 30 by means of its own flexible tabs 44 which extend radially inward around the shoulders 25 of the application plate 13 onto the latter. There is a translation of the application force generated by the membrane spring 32 between the application point of the flexible tabs 44 and the shoulders 25 in relation to the latter and the studs 36, to which the membrane disc 30 can be clamped by deformation. By means of a release mechanism 46 which is guided so that it can be displaced axially on a guide tube 29 of the transmission, and which is engaged on the radially inner ends of the flexible tabs 40 of the membrane disc 30, the application plate 13 can be relieved of the application force of the membrane spring and released.

During release, as a result of a movement of the release mechanism 46 as illustrated in FIG. 1 to the right, the excursion of the tabs 40 of the membrane disc 30 and of the flexible tabs 44 of the membrane spring 32 is eliminated, as a result of which the application force acting between the application plate 13 and the friction lining 21 of the clutch disc 17 is also eliminated. The deformation of the membrane disc 30 and thus its clamping connection to the studs 36 of the axial guide 38 is completely eliminated as soon as the application plate 13, although still in contact with the friction lining of the clutch disc 17, no longer transmits any application force to the friction lining 21. The neutralization of the application force is achieved by an axial movement of application plate 13 and membrane disc 30 over a negligibly short movement segment which corresponds to the deformation of the friction linings 21 caused by the application force.

In an additional movement segment, the membrane disc 30 is pulled by the release mechanism 46 with a movement parallel to itself into its release position. The application plate 13 is simultaneously pushed into its release position, to the right as shown in FIG. 1, by energy storing devices 50 in the form of leaf springs fastened in the circumferential area and connecting the application plate 13 to the clutch housing 11.

For engagement, the release mechanism 46 is released, so that the membrane spring 32, on account of its prestress, can displace the membrane disc 30 by means of a movement of the latter parallel to itself in the axial direction, until the membrane disc 30 comes into contact with the shoulders 25 of the application plate 13, and has pushed them against the friction lining 21 of the clutch disc 17. This position of the membrane disc 30 and application plate 13 forms the clutch point, since, starting from this position, the engagement is effected by application of the application force. As a result of the continued action of the membrane spring 32, the tabs 40 of the membrane disc 30 are moved toward the application plate 13 around their shoulders 25, whereby the membrane disc 30 is clamped on the studs 36 of the axial guide 38, and the transmission of the application force to the application plate 13, and from the latter to the friction lining 21 of the clutch disc 17, proceeds with the above-mentioned translation.

On the pressure plate claimed by the invention, accordingly, only inside the above-mentioned movement segment, in which the tabs 40 of the membrane disc 30 are moved around the shoulders 25 of the application plate 13, is there a deformation of the membrane disc 30. On account of the negligible length of this first movement segment, the work which is required to deform the membrane disc 30 is also negligibly low. In the additional movement segment, in which the membrane disc 30 is only displaced parallel to itself without any deformation, only as much work must be applied as is necessary to overcome the friction during the pushing movement. The work required for the total release or engagement process is consequently minimal.

On account of the mobility of the membrane disc 30 in the axial direction inside the additional movement segment, its stroke length during each engagement process is a function of the wear and thus of the thickness of the friction linings 21 on the clutch disc 17, since the membrane disc 30, driving the application plate 13, is always moved far enough toward the clutch disc 17, until the application plate 13 comes into contact with the friction linings 21. Then, when the application force is applied, the clamping connection between the membrane disc 30 and the studs 36 of the axial guide 38 is produced, so that a readjustment of the coupling or clutch point occurs during each engagement process.

Since the movement segment in which the membrane disc 30 can be moved parallel to itself increases in size with increasing wear to the friction linings, a release mechanism 46 is required, the stroke length of which can be adapted to the axial shifting of the coupling or clutch point. This is easy to accomplish, in particular when a hydraulic release mechanism 46 is used, since when there is a change in the stroke length, the hydraulic release mechanism 46 can draw the missing amount of hydraulic fluid. Such a release mechanism 46 is disclosed, for example, in German Patent No. 39 16 317 A1.

If, in the absence of a membrane spring 32, the application means 31 are formed by an engagement mechanism 47, it is also possible to achieve a change in the stroke length with it in the manner described above. Embodiments with an engagement mechanism 47 are described in detail below.

Figure 2:
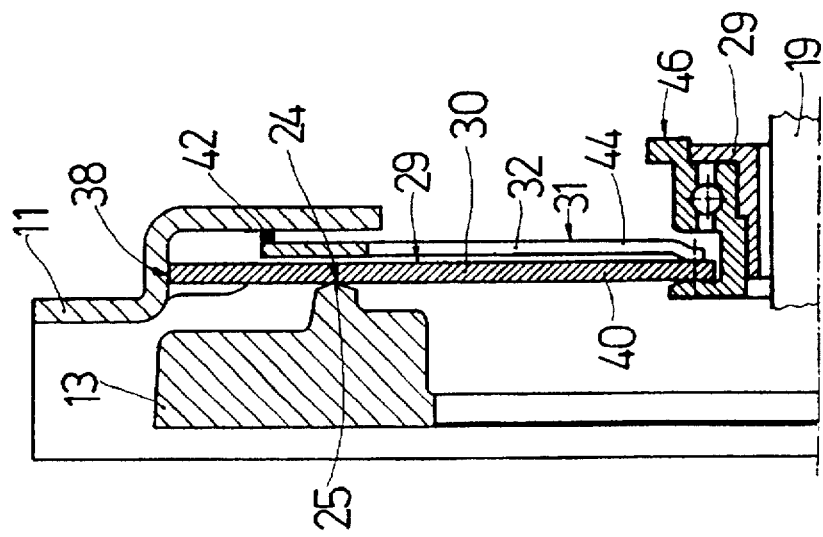
FIG. 2 is a cross section the same as in FIG. 1, but where essentially only the application plate, the transmission element, the membrane spring and the release mechanism exerting tension are shown, and the transmission element, in contrast to FIG. 1, is in frictional contact radially outwardly with the clutch housing.

In the illustration in FIG. 2, which is simplified in relation to FIG. 1 and shows a pressure plate which differs from FIG. 1 in that the axial guidance 38 of the membrane disc takes place in the radially outer area on a segment of the clutch housing 11 which runs axially. Consequently, the clamping of the membrane disc 30 occurs when there is an excursion of the tabs 40 around the shoulders 25 with respect to the segment of the clutch housing 11 which runs axially.

FIGS. 3 through 8 are simplified in relation to FIG. 1 and omit details of the structure of FIG. 1.

Figure 3:
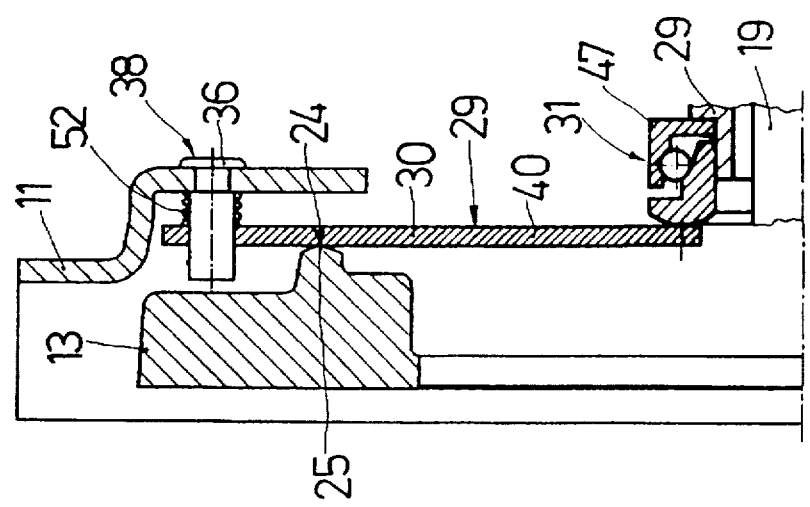
FIG. 3 same as FIG. 2, but with a transmission element which is separated radially outwardly from the clutch housing, and an engagement mechanism which exerts pressure.

FIG. 3 shows a pressure plate in which the membrane disc 30, as claimed by the solution illustrated in FIG. 1, is mounted so that it can be displaced on studs 36 of the axial guide 38. In this model, however, an engagement mechanism 47 acts as the application means 31, while one of the springs 52 surrounding the studs 36, the force of which is lower by several times than the application force, provides for the membrane disc 30 to be held in contact with the shoulders 25 of the application plate 13. During release, the application plate 13 is moved by the energy storing devices 50 (FIG. 1) located in its circumferential area toward the studs 36, and thereby displaces the membrane disc 30 parallel to itself against the action of the springs 52. During engagement, this process takes place in the opposite direction, whereby, as soon as the application plate 13 has come into contact with the friction lining 21 of the clutch disc 17, the membrane disc 30, which is clamped to the studs 36 in the vicinity of its tabs 40, experiences an excursion toward or with respect to the shoulders 25 of the application place 13.

Figure 4:
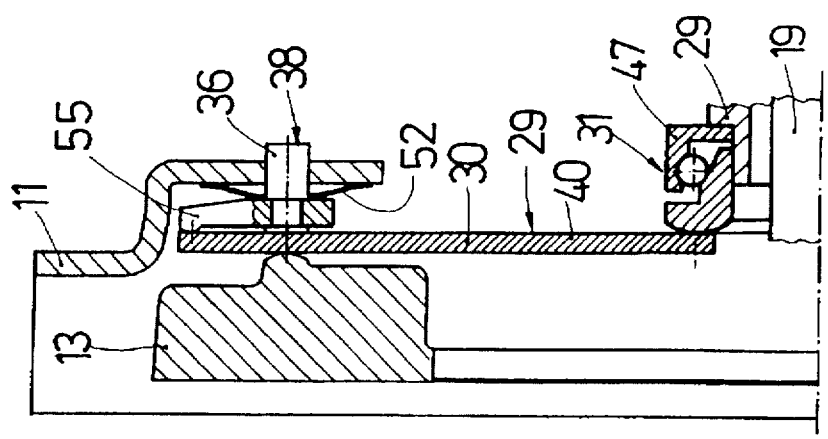
FIG. 4 same as FIG. 3, but with a different mounting of the transmission element.
Figure 5:
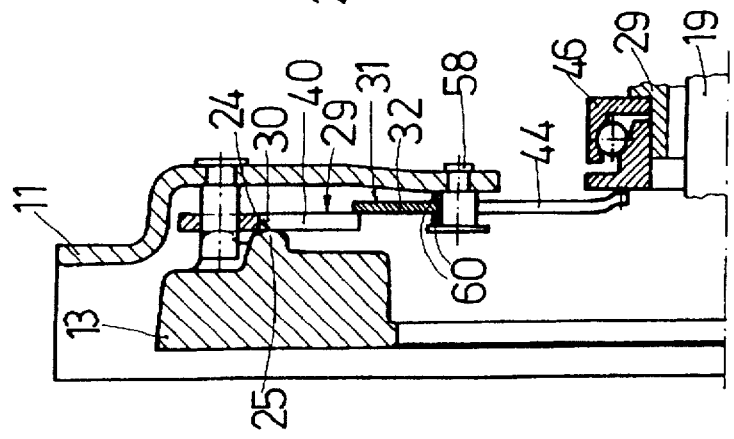
FIG. 5 same as FIG. 3, but with a membrane spring which acts on the transmission element.

In the embodiment illustrated in FIG. 4, the studs 36 are mounted so that they can move in the clutch housing 11, and support a lever 55 which is supported on one end by means of a spring 52 on the clutch housing 11, and on the other end on the membrane disc 30 in its radially outer area. During engagement, the engagement mechanism 47 which acts as the application means 31 displaces the membrane disc 30 parallel to itself, until the application plate 13 comes into contact with the friction lining 21 of the clutch disc 17. When the application force is applied, the axially movable studs 36 are clamped by means of the levers 55 in the clutch housing 11, whereupon the excursion of the tabs 40 of the membrane 30 can take place toward the application plate 13 around their shoulders FIG. 5 illustrates an additional embodiment of the pressure plate with a membrane spring 32 which acts as the application means 31. In this case, the membrane disc 30 which is mounted so that it can move on the studs 36 is designed with severely shortened tabs 40, while the membrane spring 32, which is braced radially farther inward on the clutch housing by means of studs 58 and wire rings 60, extends radially outward just far enough so that it becomes engaged with the shortened tabs 40 of the membrane disc 30. As soon as a release mechanism 46 transmits a force toward the application plate 13 to the flexible tabs 44 of the membrane spring 32, the membrane spring 32 is separated from the tabs 40 of the membrane disc 30 in the radially outer area, so that the transmission of an application force ends and the application plate 13, under the action of the energy storing devices 50 (FIG. 1) in its circumferential area displaces the membrane disc 30 toward the membrane spring 32. For engagement, the release mechanism 46 is pulled back into its initial position by relieving the force.

Figure 6:
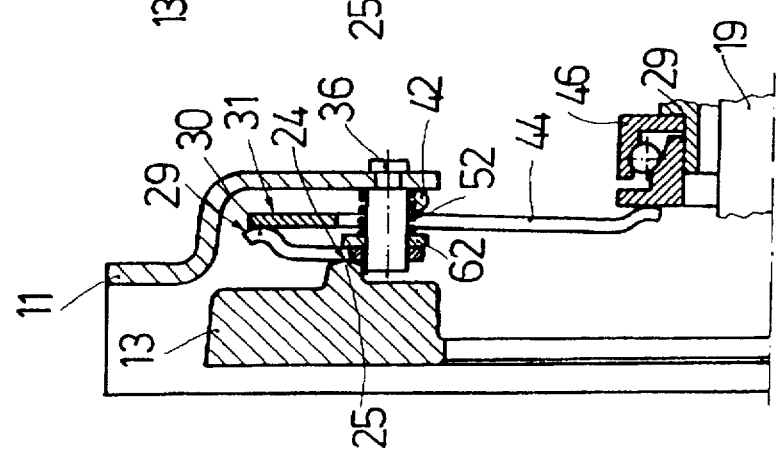
FIG. 6 same as FIG. 5, but with a transmission element which is curved in the axial direction.

On the pressure plate illustrated in FIG. 6, the membrane spring 32 which forms the application means is fastened to the studs 36 of the axial guide 38, while the plastically deformed membrane disc 30 can be moved in the axial direction of the studs 36. In this case, the membrane spring 30, which is in contact with the membrane disc 30 in the radially outer region, pushes the membrane dies 30 toward the pressure plate 13, and pushes it and the pressure plate 13 until the latter comes in contact with the friction lining 21 of the clutch disc 17. As a result of the deformation of the membrane disc 30 during transmission of the application force, this deformation force causes a tilting of the discs 62 located between it and the membrane spring 32 and supported by springs 52 on the clutch housing 11, on the studs 36, and thus a clamping of the membrane disc 30 on the axial guide 38. The membrane disc 30 is then in contact with the shoulders 25 of the clutch disc 13, and is bent with its area lying radially outside these shoulders around the shoulders 25 toward the application plate 13. To release the application force, a release mechanism 46 is moved toward the application plate 13 against the radially inner ends of the tabs 44 of the membrane spring 32.

Figure 7:
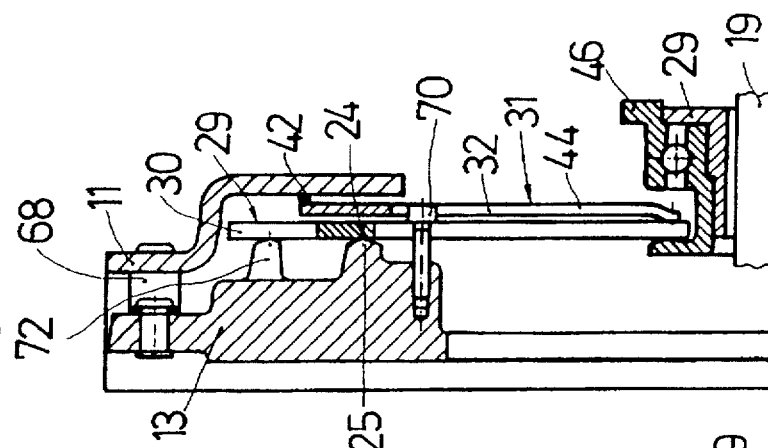
FIG. 7 same as FIG. 1, but with a retaining means which holds the application plate in contact with the transmission element.

In FIG. 1, the energy storing devices 50 were prestressed in the circumferential area of the application plate 13 so that, when the application force was released, the application plate was moved toward the membrane disc 30 or toward a membrane spring 32. In contrast, FIG. 7 shows a pressure plate in which energy storing devices 68 in the form of leaf springs are active in the opposite direction, and to suppress vibrations of the application plate, they prestress or bias the application plate toward the friction lining of the clutch disc 17, and thus generate a forced clearance of the application plate 13 from the transmission element 29. These energy storing devices 68 cooperate with a retaining means 70 which is formed, as shown in FIG. 7, by screws which are screwed into each threaded hole of the application plate 13, the heads of which are supported on the membrane disc 30 with their sides facing the application plate 13. By means of these retaining means, the application plate 13 is prevented from moving excessively far from the membrane disc 30 as a result of the action of the energy storing device 68. By means of shoulders 72 which are formed on the pressure plate radially outside its shoulders 25 and next to the studs 36, the membrane disc 30 can in this case be supported so that a deformation of the membrane disc 30 in the vicinity of the studs 36 can be prevented. Such shoulders 72, as shown in FIG. 1, can also be advantageously used with energy storing devices 50 which work in the opposite direction.

Figure 8:
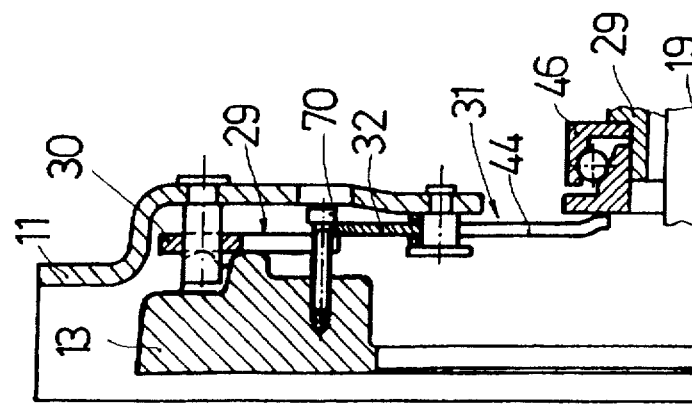
FIG. 8 same as FIG. 7, but with the retaining means contacting the membrane spring from behind.

The pressure plate illustrated in FIG. 8 has the same basic construction as the one illustrated in FIG. 5, but is designed with a retaining means 70 in the form of a screw, the head of which is supported with its side facing the application plate 13 on the membrane spring 32, which in turn means that this pressure disc or plate is designed with an energy storing device 68 in the circumferential area of the application plate 13, by means of which the latter can be pressed toward the friction lining of the clutch disc.

Instead of the membrane disc 30 as shown in the drawing, the transmission element 29 can also be formed by lever-like individual segments, each of which is located on at least one stud 36 in the axial guide 38. Since these individual segments are located inside the clutch housing 11, as is the above-mentioned membrane disc 30, they are not illustrated in an additional figure.

In one embodiment of the invention when the membrane disc 30 is held against the stops 25 by among other structures the application means 31, the membrane disc 30 is compressed and thus "oil cans" such that the end 30a with the holes 30b, which holes 30b surround the studs 36, and can grasp and release the studs 36. The end 30a is distorted by the oil canning such that the holes 30b become distorted and grasp the studs 36. As the release mechanism 46 moves the end 30c of the membrane disc 30 to the right, the oil canning of the membrane disc 30 is preferably reduced, therefore reducing the distortion of the end of 30a of the membrane disc 30, and thus the holes 30b will be enlarged along the longitudinal axes of the studs 36 such that they no longer clamp onto the studs 36 thereby allowing the application means 30 to move more at least relatively freely upon the studs 36. When the release mechanism 46 moves to the left which permits the end 30c of the membrane disc 30 to move to the left, the holes 30b again grips the studs 36. Thus the membrane disc 30 applies a force onto the stops 25 to engage the clutch friction lining 21.

As the application means 31 reduces pressure against the end 30c of the membrane disc 30, the end 30c is moved to the left, which therefore in at least one embodiment "oils cans" the membrane disc 30 between the stops 25 and the point of contact 30d between membranes disc 30 and release element 46. This oil canning twists or distorts the end 30a of the membrane disc 30 so that the membrane disc 30 again deforms at end 30a to clamp the holes 30b about the studs 36.

In other words, as the stresses within the membrane disc 30 are built up, and since the length of the membrane disc 30 from the end 30c to the end 30a remains in one embodiment, substantially constant during the engaging and disengaging of the clutch, the material which makes up the length of the membrane disc 30 from the end 30a to end 30c remains substantially linearly constant. Therefore, the membrane disc 30 must deform as an oil can deforms and is well known with Bellville springs and membranes, that as the end 30c is deformed to cause an oil canning, the stresses are transmitted throughout the membrane disc 30, thereby distorting the end 30a of the membrane disc 30 and grasping and releasing the studs 36. Since the inner diameter of the membrane disc 30, which is defined by the end 30c of the membrane disc 30, remains substantially constant in diameter in one embodiment, during compression and relaxation, the end 30a will distort in an S-shape substantially to maintain the linear length of the membrane disc 30 along the surface of the disc 30 from the end 30a to the end 30c, and thereby forming somewhat of an undulating or S-shaped distortion of the membrane disc 30, thereby producing the distortion at the end 30a which is at least partially S-shaped thereby reducing the diameter of the holes 30b in the longitudinal axis of the studs 36 to clamp the membrane disc 30 to the studs 36.

Figure 1A:
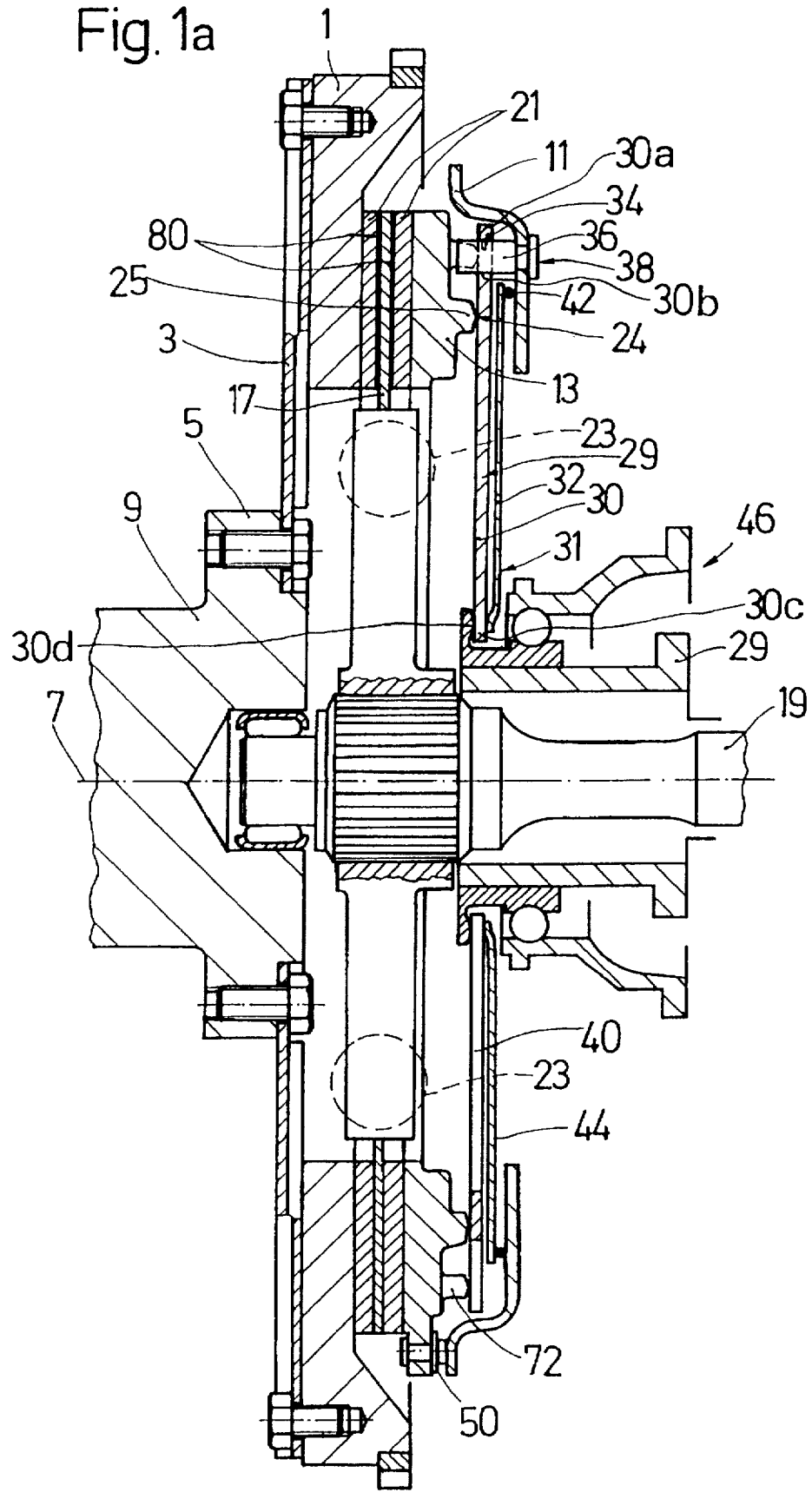

Further regarding the membrane disc 30, as is well known with membrane or Belleville discs or springs depending upon the thickness, the length and restraints built within the Belleville washer or disc, which restraints restrict the movement of the diaphragm structure of the Belleville washer or disc, as the Belleville washer is moved from a relaxed or externally unrestricted state, the stresses within the Belleville disc or spring are set up in a static fashion. The static stresses within the Belleville disc when the disc 30 is not externally stressed by the release mechanism 46, typically form a curve where the center portion of the disc represented by the end 30c in FIG. 1a, is displaced axially from the end 30a, as shown in FIG. 1. The curve of the Belleville washer or membrane 30, will have this curvature, and the holes 30d which grasp the studs 36 due to the distortion thereof, and therefore clamp the membrane disc 30 onto the studs during operation. These holes 30d on end 30a will be bored so that they align with the studs 36 when the release mechanism 46 is moved to the right position in FIG. 1. As the end 30c of the membrane spring 30 is moved, in one embodiment, from a substantially relaxed or externally not stressed position, to an externally stressed position, the stresses that are built up in a Belleville disc or spring will distort the Belleville spring or membrane 30, such that an S-type curve forms in the membrane disc 30. These curve or S-curves are due to the inherent design and structure of Belleville springs, due to the restrictions on at least one portion of the Belleville spring. This portion of the Belleville spring may be the external periphery of the spring which restricts a substantial change in the outside diameter of the Belleville spring, or it may be a portion of the spring about which stresses propagate. Therefore, since the length of the Belleville spring from the inside diameter, represented by the end 30c, to the outside diameter, represented by the end 30a, of membrane disc 30, restricts the expansion of the membrane spring 30, these curves will form, which one embodiment will distort the end 30a of the Belleville or membrane disc 30, such that the membrane disc 30 distorts its holes 30b, and thus they clamp against the studs 36. When the Belleville washer or membrane spring 30 assumes a less stressed position, the holes 30b move such that their longitudinal axes are preferably in alignment with the longitudinal axes of the studs 36. In an alternative embodiment, the longitudinal axes of the studs 36 and the holes 30b may not be aligned, and the holes 30b may not have their longitudinal axis substantially perpendicular to the plane of the end 30a of the membrane spring 30. Therefore, depending upon the inherent characteristics of the membrane disc 30 which is used in a particular embodiment, the holes may or may not have a longitudinal axes which are perpendicular to the surface of the end 30a of the membrane spring 30. However, usually, and preferably, the holes 30b have longitudinal axes which are perpendicular or substantially perpendicular to the opposite surfaces of the membrane disc 30.

As can be seen in FIGS. 1 and 1a, the membrane disc 30 is preferably substantially thicker than the application means 31, which application means is also preferably a Belleville or a membrane disc. By making the membrane disc 30 thicker than the application means 31, the stresses which propogate through the Belleville or membrane disc 30, will set up stresses which are different at the different outer major surfaces of the membrane or Bellevile disc 30, which stresses will provide the undulating or S-shaped distortions in the membrane disc 30. In one embodiment, by providing a somewhat different material characteristic at the contact points 24, such that, the contact point 24 may act as a fulcrum point whereby the stresses are propogated from the inside portion of the Belleville or membrane disc 30, and restricted by the contact points 24, to the outer portion of the membrane disc 30 at the end 30a, the end 30a will move back and forth in FIGS. 1 and 1a in a left and right manner, such that the distortion of the end 30a forms a one position, in which the holes 30b are aligned with the studs 36 and another position, preferably in one embodiment when the S-shape or other shape has been formed at the end 30a of the membrane disc 30, which distortion will clamp the holes 30d onto the studs 36.

In one embodiment of the invention, the membrane disc preferably has a ratio of length between the ends 30a and 30c to the thickness of a representative portion of the disc of about 30 to 1. In other embodiments of the invention, the membrane disc 30 may have different ratios, for example 100 and 1, and 40 to 1, and 50 to 1.

Belleville springs are readily available from many sources, who both design and manufacture such Belleville springs, An example of a manufacturer of Belleville springs is E. C. Styberg Engineering Co., Inc. of Racine, Wis. There are a number of other companies also found in the Thomas register from which Belleville springs are also available.

In another embodiment of the invention, the membrane spring 30 may have an outer diameter close to the holes 30b which expands as the end 30c is moved from right to left in FIGS. 1 and 1a. This increase in diameter would therefore bind the holes 30b against the studs 36, such that the holes 30c jam themselves against the studs 36 by the distortion of the membrane disc 30, and then lock themselves against the studs 36. A Belleville washer of this type could be a modification of the typical Belleville type membrane spring that is found in most manual transmissions, where the tangs or tabs or projections 40 from the outer end 30a of the membrane disc 30 where the tangs or tabs or projections 40 are connected together could be relatively narrow. That is, the outer diameter of the end and the basis of the tangs or projections or tabs is relatively small. That is to say that annular region that connects the projections which project inwardly towards end 30c of a membrane disc such as 30, is relatively thin so that when the ends 30c of the projections force the outer end 30a to expand outwardly.

The outer end 30 at its extreme upper end as shown in FIGS. 1 and 1a, could distort and the extreme outer diameter of the membrane spring 30 could therefore increase in diameter. An embodiment where such a membrane spring 30 could be utilized is disclosed in FIG. 2, to be described in more detail later.

By varying the thickness from one portion of the membrane spring 30 to another, varying the outer diameter and the inner diameter, varying the positions of the holes 30b, varying the structure of the membrane spring 30 along its length, and by restricting certain portions of the membrane spring 30, so that the diameter and distortions of the membrane spring 30 at selected portions do not expand and contract as if the spring were homogeneous throughout, also changing the dimensions and the taper of the tangs or projections which form the interior portion of the membrane spring 30, and also the holes at the bases of the tangs or projections or tabs could provide the required distortion of the membrane spring 30, especially at the end 30a. The characteristics of the membrane spring 30 can be changed so that the desired distortion of the outer end and/or the dimensions and locations of the holes 30b change to a degree which will provide the jamming or grasping action which will hold the appropriate portion of the membrane disc 30 such as the outer end 30a is in an appropriate position during the engagement and the disengagement of the clutch friction linings In FIGS. 3–8, the outer diameter end of the membrane spring 30, at least in one sub-embodiment of each of the embodiments of FIGS. 3–8, the outer end of the membrane spring 30 distorts so that it grips studs or other guiding means.

In yet another embodiment of the invention with regard to especially FIGS. 1, 1a, and 2, as the membrane spring moves from its right position in FIG. 1, if for example, the tabs 40 are very stiff and the area about the periphery 38 of the membrane spring 30 is relatively weak, the outer end portion 30a will actually increase in diameter such that the holes 30b will grasp the studs 36. With regard to FIG. 2, the outer portion of the membrane spring 30 will expand to make contact with the portion 38 of the housing 11.

In yet a further embodiment of the invention, if the membrane disc is relatively thick such that the holes 30b, as shown in FIGS. 1 and 1a, are relatively long, and the angles of the longitudinal axes of the holes are disposed at an angle with respect to a perpendicular to the membrane disc 30, at the end 30a, when the membrane spring 30 is disposed to the right, the holes 30b will have their longitudinal axes substantially aligned with the longitudinal axes of the studs 36. Therefore permitting relatively free movement of the membrane spring 30 at its end 30a about the studs 36. However, when the lower end 30c of the membrane spring 30 moves to the left so that it is essentially in the position shown in FIGS. 1 and 1a, the upper end rotates such that the holes 30b no longer have their longitudinal axes aligned with the longitudinal axes of the studs 36, and the holes 30b bind upon the studs 36, thereby grasping the studs 36, and holding fast to the studs 36. This grasping of the studs 36 by the holes 30b permits a force to be transferred from the membrane disc 30 to the stops 25, and thereby engage the clutch disc 17 with the friction linings 21.

One feature of the invention resides broadly in the motor vehicle friction clutch with a pressure plate which is fastened with the interposition of a clutch disc with friction linings to a flywheel, and has a common axis of rotation with the flywheel, comprising an application plate located non-rotationally—but so that it can move axially—in a clutch housing, and an application means to apply the application force, characterized by the fact that the clutch housing 11 is provided with an axial guide 38 for a transmission element 29 which is located between the application means 31 and the application plate 13, on which the transmission element 29, as long as there is no transmission of an application force between the application plate 13 and the friction linings 21 of the clutch disc 17 during an engagement and release movement, can track the movement of an engagement and release mechanism 46, 47, while as soon as it, the application plate comes in contact with the friction linings 21 of the clutch disc 17 for the transmission of the application force, it can track by means of a deformation the movement of the engagement and release mechanism 46, 47 at its contact point 24 with the application plate 13 with a translation which, after the generation of a clamping connection between the transmission element 29 and the axial guide 38, is a function of the distance between the point of engagement of the application means 31 on the transmission element 29 and the contact point 24 of the transmission element with the application plate 13 in relation to the distance between this contact point and the clamping connection of the transmission element 29 on the axial guide 38.

Another feature of the invention resides broadly in the motor vehicle friction clutch with studs provided on the clutch housing which extend parallel to the axis of rotation of the pressure plate toward the application plate, characterized by the fact that the axial guide 38 is formed by these studs 36 which are engaged in recesses 34 of the transmission element 29.

Yet another feature of the invention resides broadly in the motor vehicle friction clutch characterized by the fact that the studs 36 are each surrounded by a spring 52 which keeps the transmission element 29 in contact with the application plate 13 and is supported on the clutch housing 11.

Still another feature of the invention resides broadly in the motor vehicle friction clutch characterized by the fact that the application means 31 are formed by a membrane spring 32 which is located between the clutch housing 11 and the transmission element 29.

A further feature of the invention resides broadly in the motor vehicle friction clutch characterized by the fact that the studs 36 are mounted in the clutch housing 11 so that they can move in the axial direction and support a lever 55, by means of which they can be tilted when pressurized or acted on or pushed by the transmission element 29 in the respective bearing.

Another feature of the invention resides broadly in the motor vehicle friction clutch characterized by the face that the transmission element 29 is formed by a membrane disc 30, which comes into contact with one side against a shoulder 25 of the application plate 13, which shoulder 25 acts as a contact point 24, and with its other side is supported by means of the at least one spring 52 on the clutch housing 11, which spring 52 corresponds to the studs 36 of the axial guide 38.

Yet another feature of the invention resides broadly in the motor vehicle friction clutch characterized by the fact that the application plate 13 is configured in the circumferential area with energy storing devices 50 which act on the clutch housing 11 to press against the transmission element 29, and has at least one stop 72 on its side facing the transmission element 29, next to each of the studs 36.

Still another feature of the invention resides broadly in the motor vehicle friction clutch characterized by the fact that the application plate 13 is held in contact against the stop 25 by means of a retaining means 70 against the action of an energy storing device 68 which pushes the application plate 13 away from the clutch housing 11 and is engaged in the circumferential area with the application plate 13.

A further feature of the invention resides broadly in the motor vehicle friction clutch with an arrangement which includes the lining springs on the clutch disc, which arrangement, during the release process, by means of a portion of the actuation distance of the engagement and release mechanism, effects a gradual decrease of the torque transmitted by the friction clutch or the clutch disc, characterized by the fact that the transmission element 29, as a result of its location on the axial guide 38 and pressurization by means of at least one spring 32, 52 toward the application plate, with respect to its travel during each engagement process, can be once again adjusted to the current thickness of the friction linings 21 and of the resilience of the lining 80 on the clutch disc 17.

Another feature of the invention resides broadly in the motor vehicle friction clutch characterized by the fact that the application means 31 are formed by an engagement mechanism 47 which acts on the transmission element 29, and in which the travel can be adjusted to the respective movement segment of the transmission element 29.

Yet another feature of the invention resides broadly in the motor vehicle friction clutch characterized by the fact that the transmission element 29 is formed by a number of lever-like individual elements which come into contact with one side on the shoulder 25 of the application plate 13, and are supported with their other side by means of the at least one spring 52 on the clutch housing 11.

One feature of the invention resides broadly in the friction clutch, in particular for motor vehicles, comprising a thrust plate mounted in a housing so that it cannot rotate but can move axially, and which is pressed by the force of a cup spring with the interposition of a clutch disc with friction linings toward a counterthrust plate, and the housing is fastened to the counterthrust plate, whereby the cup spring presses with its uninterrupted outside diameter against the thrust plate and is in contact with its inside diameter interrupted by notches on the housing, a clutch release mechanism to release the thrust plate against the force of the cup spring, characterized by the fact that located in the housing 2' there are spacer bolts 6' on a middle diameter, which extend toward the thrust plate 3', the cup spring 4' with its notches 5' surrounds the spacer bolts 6', between the cup spring 4' and thrust plate 3' there is a clutch release element 9', which is realized approximately in the shape of a membrane spring, which is in contact with its outside diameter on the thrust plate, with openings 1' for the passage of the spacer bolts 6' and with flexible tongues 12' running radially inward, and which is axially braced on the spacer bolt heads 7', whereby cup springs 4' and clutch release elements 9' have essentially the same outside diameter, and there is a spacer or direct contact element wire ring 13' located between them.

Another feature of the invention resides broadly in the friction clutch characterized by the fact that the clutch release element 9', starting from the outside diameter, has slots 11', which run radially inward, which are offset circumferentially from the openings 10' for the passage of the spacer bolts 6' and extend at least to the latter.

Yet another feature of the invention resides broadly in the friction clutch characterized by the fact that the clutch release element 9' is provided with a slight axial prestress, and that contact with the spacer bolt heads 7' is guaranteed when the clutch is engaged.

Still another feature of the invention resides broadly in the friction clutch characterized by the fact that the prestress is designed so that it is approximately eliminated when the friction clutch 1' is disengaged.

A further feature of the invention resides broadly in the friction clutch, in particular for motor vehicles, comprising a thrust plate mounted in a housing so that it cannot rotate but can move axially, and which is pressed by the force of a cup spring with the interposition of a clutch disc with friction linings toward a counterthrust plate and the housing is fastened to the counterthrust plate, whereby the cup spring presses against the thrust plate with its outside diameter and is in contact with its inside diameter on the housing, a clutch release mechanism to release the thrust plate against the force of the cup spring, characterized by the fact that the clutch release mechanism has a clutch release element 9' which is designed in the form of a component similar to a membrane spring, which is supported by means of a middle diameter by means of spacer bolts 6' on the housing 2', by means of its outside diameter on the thrust plate 3', and is provided radially inward with flexible tongues 12', whereby the clutch release element 9', when the friction clutch is engaged, exerts only a slight releasing force, and with increasing movement toward a disengaged clutch there is a decrease of the releasing force to a value of approximately 0.

Another feature of the invention resides broadly in the friction clutch characterized by the fact that the clutch release element 9' interacts with a wear compensation device 17' which, if there is a wear of the friction linings, influences the releasing force curve either insignificantly or not at all.

Yet another feature of the invention resides broadly in the friction clutch characterized by the fact that between the outside diameter of the clutch release element 9' and the thrust plate 3', there is a wear compensation device 17' which, when there is wear of the friction linings of the clutch disc, changes the relationship between the thrust plate and the clutch release element so that the position of the clutch release element 9' remains unchanged, regardless of the wear state of the friction lining.

Still another feature of the invention resides broadly in the friction clutch, in particular for motor vehicles, comprising a clutch housing which is fastened to a counterthrust plate and defines an axis of rotation, a thrust plate mounted in the clutch housing and guided so that it cannot rotate but can be moved axially and has a friction surface to clamp a clutch disc between the thrust plate and the counterthrust plate, a cup spring between the thrust plate and the clutch housing to generate the clamping force for the clutch disc, a clutch release mechanism to eliminate the clamping force and to release the thrust plate, characterized by the fact that the clutch release mechanism includes a clutch release element 9' which has a component similar to a membrane spring which is located and designed so that when the friction clutch 1' is engaged, it exerts a low releasing force, and there is an increase of the releasing force with an increasing movement in the direction of the disengagement of the clutch.

A further feature of the invention resides broadly in the friction clutch characterized by the fact that the clutch release element 9' interacts with a wear compensation device 17' which, when there is wear of the friction lining 23', influences the releasing formed curve only insignificantly or not at all.

Another feature of the invention resides broadly in the friction clutch characterized by the fact that the wear compensation device 17' is located between the outside diameter of the clutch release element 9' and the thrust plate, and when there is wear to the friction linings 23' the relationship between the thrust plate 3' and the clutch release element 9' changes so that, regardless of the amount of wear to the friction lining 23', the installed position of the clutch release element 9' remains unchanged.

Yet another feature of the invention resides broadly in the friction clutch characterized by the fact that the clutch release element 9' has numerous openings distributed on the circumference on a concentric diameter, into which spacer bolts 15' fastened to the clutch housing 2' extend, and the clutch release element 9' is supported on one hand on the heads 20' of the spacer bolts and on the other hand, in the vicinity of its outside diameter, on the thrust plate 3'.

Still another feature of the invention resides broadly in the friction clutch characterized by the fact that the clutch release element 9', when the friction clutch 1' is engaged, exerts a defined low releasing force on the thrust plate 3', and therefore a secure, unilateral contact with the heads 20' of the spacer bolts 15' is guaranteed.

A further feature of the invention resides broadly in the friction clutch characterized by the fact that the cup spring 4' is supported on one side on the thrust plate 3' and on the other side on the heads 20' of the spacer bolts 15'.

Another feature of the invention resides broadly in the friction clutch characterized by the fact that the spacer bolts 15' extend from the clutch housing 2' toward the thrust plate 3', and the clutch release element 9' is in contact on the side of the heads 20' facing the clutch housing 2', and the cup spring 4' is in contact on the side facing the thrust plate 3'.

Yet another feature of the invention resides broadly in the friction clutch characterized by the fact that the cup spring 4' is in contact on its inside diameter with the spacer bolts 15' and on its outside diameter with the thrust plate 3'.

Still another feature of the invention resides broadly in the friction clutch characterized by the fact that the thrust plate 3' has several bolts 28 distributed on the circumference, which run parallel to the axis of rotation 3' in the direction of the clutch housing 2', pointing away from the friction surface of the thrust plate 3', radially outside the clutch release element 9', each bolt 28' runs through a lever 27' which can be fixed on the bolt 28' by a clamping force, pressure is applied to each lever 27' in its terminal area pointing radially inward, radially inside the bolt 28', by the clutch release element 9' pointing away from the friction surface of the thrust plate 3', and is in contact with its terminal area pointing radially outward, radially outside the bolt 28', against a housing stop 25', and a spring 26' pushes each lever toward the thrust plate until makes contact with the housing stop 25'.

A further feature of the invention resides broadly in the friction clutch characterized by the fact that each head 20 of a spacer bolt 15', on the bearing area side for the release element 9', has a contour 21, which produces a radial shift of the support diameter during the clutch release process from the greater value $D_{i1}$ to the lesser value $D_{i2}$, and thus a change in translation in the sense of an increase of the clutch release force.

Another feature of the invention resides broadly in the friction clutch characterized by the fact that the clutch release element 9', when the thrust plate is in the position for installation or transport, is in a position in which it attempts to exert an engagement force on the thrust plate, whereby it comes into contact radially inside the spacer bolts 15' on stops 19 of the clutch housing 2' by means of residual stress.

Some examples of release assemblies for friction clutches, and some examples of friction clutches are disclosed in the following U.S. Patents: U.S. Pat. No. 4,201,282 to Ernst et el. on May 6, 1980, entitled "Clutch Release Assembly and Bearing Therefore"; U.S. Pat. No. 3,920,107 to Limbacher on Nov. 18, 1975, entitled "Self-Aligning Clutch Release Bearing Arrangement"; U.S. Pat. No. 4,781, 050 to Link et el. on Oct. 3, 1989, entitled "Clutch Arrangement"; U.S. Pat. No. 4,542,813 to Schierling on Sep. 24, 1985, entitled "Frictional Clutch Assembly"; and U.S. Pat. No. 4,637,505 to Huber on Jan. 20, 1987, entitled "Fluid-operated Clutch Disengaging Apparatus".

Types of membrane springs which could be used in accordance with the embodiments of the present invention are disclosed in the following U.S. Patents: U.S. Pat. No. 5,240,227 to Sich on Aug. 31, 1993, entitled "Electromagnetically Operated Valve"; U.S. Pat. No. 4,890,815 to Hascher et al. on Jan. 2, 1990, entitled "Valve with Membrane Spring"; U.S. Pat. No. 4,535,816 to Feder et el. on Aug. 20, 1985, entitled "Pressure Controller"; U.S. Pat. No. 3,902,527 to Schwerin et el. on Sep. 2, 1975, entitled "Electromagnetically Actuatable Multipath Valve"; and U.S. Pat. No. 2,117,482 to Klix entitled "Clutch Lever Plate".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle friction clutch, said friction clutch comprising:

a pressure plate;

said pressure plate having an axis of rotation;

a clutch disc with friction linings;

a flywheel disposed adjacent to said clutch disc;

a clutch housing, in which said pressure plate and said clutch disc are at least partially disposed;

said friction linings being engageable by and disengageable from said pressure plate and said flywheel;

said friction linings being subject to wear as a result of repeated engagement with and disengagement from said pressure plate and said flywheel;

said friction linings including a first set of friction linings and a second set of friction linings;

said clutch disc further comprising resilient means disposed axially between said first set of friction linings and said second set of friction linings;

a release mechanism for engaging and disengaging said friction linings to said pressure plate and to said flywheel;

means for transmitting a movement and a force from said release mechanism to said pressure plate;

said means for transmitting comprising a membrane spring;

said membrane spring being located between said clutch housing and said pressure plate;

said pressure plate comprising a stop;

said means for transmitting having a first side and a second side, said second side being disposed opposite to said first side;

said stop contacting said means for transmitting on said first side;

said means for transmitting being supported by said clutch housing on said second side;

said release mechanism comprising actuating means, movable along a predetermined path, for engaging and disengaging said friction clutch;

means for transmitting a movement and a force from said release mechanism to said pressure plate;

said actuating means having means for adjusting the movement distance along said predetermined path of said actuating means;

guide means for guiding said means for transmitting;

said guide means guiding said means for transmitting upon said means for transmitting being in contact with said pressure plate;

said means for transmitting comprising means for permitting tracking the movement of said pressure plate by said means for transmitting upon the occurrence of a first force relationship between said pressure plate and said means for transmitting;

said means for permitting tracking the movement of said pressure plate comprising means for adjusting;

said means for adjusting including means for compensating for wear upon said friction linings to thereby maintain the force of said membrane spring upon said pressure plate;

said means for transmitting comprising means for stopping movement of said means for transmitting by frictionally engaging said means for transmitting against said guide means upon the occurrence of a second force relationship between said pressure plate and said means for transmitting;

said guide means having at least one surface, for stopping movement of said means for transmitting by frictionally engaging said means for transmitting against said guide means, being disposed substantially parallel to said axis of rotation for guiding said means for transmitting and for stopping movement of said means for transmitting by frictionally engaging said means for transmitting against said guide means;

said means for stopping movement of said means for transmitting by frictionally engaging said means for transmitting against said guide means comprising studs mounted on said clutch housing;

each of said studs having a longitudinal axis, the longitudinal axis of each of said studs extending substantially parallel to the axis of rotation of said pressure plate;

each of said studs extending toward said clutch disc;

said means for stopping movement of said means for transmitting by frictionally engaging said means for transmitting against said guide means further comprising recesses;

said recesses comprising passages for said studs;

each of said studs being disposed to engage with a corresponding one of said passages;

said means for stopping movement providing a fulcrum, upon the occurrence of the second force relationship, for said means for transmitting; and said fulcrum being disposed to provide a fulcrum about which forces of said release mechanism and said pressure plate act.

2. Motor vehicle friction clutch as claimed in claim 1, wherein said pressure plate comprises energy storing devices;

said energy storing devices being secured to said clutch housing;

each of said energy storage devices being configured to exert a force on said pressure plate opposite to the force exerted by said membrane spring on said pressure plate;

said pressure plate further comprising at least one shoulder facing said means for transmitting;

said at least one shoulder being disposed adjacent to said studs; and said at least one shoulder comprising means for preventing said means for transmitting from deforming upon said friction clutch being disengaged.

3. Motor vehicle friction clutch as claimed in claim 2, wherein said means for transmitting comprises a membrane disc;

said membrane disc being substantially annular;

said membrane disc having a radially inner part and a radially outer part;

said radially outer part of said membrane disc being disposed adjacent to said pressure plate;

said radially inner part of membrane disc comprising tabs;

said tabs extending radially inwardly in a direction away from said radially outer part;

said tabs of said membrane disc having radially inner ends;

said membrane spring having a radially inner portion and a radially outer portion;

said radially inner portion of said membrane spring comprising flexible tabs;

said flexible tabs extending radially inwardly in a direction away from said radially outer portion;

said flexible tabs of said membrane spring having radially inner ends;

said radially inner ends of said flexible tabs of said membrane spring being disposed adjacent to said radially inner ends of said tabs of said membrane disc;

said flexible tabs of said membrane spring being disposed for biasing said tabs of said membrane disc to thereby exert a force on said pressure plate;

said radially inner part of said membrane disc contacting said release mechanism;

said radially outer part of said membrane disc being disposed adjacent to said guide means;

said membrane disc being disposed between said membrane spring and said pressure plate;

said clutch housing comprising an inside surface;

said inside surface of said clutch housing comprising a first portion disposed perpendicular to said axis of rotation;

said first portion being substantially annular in shape;

said friction clutch comprising a wire ring;

said wire ring being disposed circumferentially on said first portion of said inside surface of said clutch housing;

said wire ring being disposed between said first portion and said membrane spring;

said membrane spring being disposed between said wire ring and said membrane disc; and said release mechanism comprises a pull type clutch release mechanism.

4. Motor vehicle friction clutch as claimed in claim 1, wherein:

said pressure plate comprises retaining means for holding said pressure plate in contact with said means for transmitting and counteracting vibrations of said pressure plate;

said retaining means comprising screws;

each of said screws having a longitudinal axis, the longitudinal axis of each of said screws extending substantially parallel to the axis of rotation;

each of said screws being disposed in said pressure plate;

said pressure plate comprising energy storing devices;

each of said energy storing devices being configured to exert a force on said pressure plate complementary to the force exerted by said membrane spring on said pressure plate;

said pressure plate comprising at least one shoulder facing said means for transmitting;

said at least one shoulder being adjacent to said studs;

said at least one shoulder comprising means for preventing said means for transmitting from deforming upon said friction clutch being disengaged; and said release mechanism comprises a pull type clutch release mechanism.

5. A motor vehicle friction clutch, said friction clutch comprising:

a pressure plate;

said pressure plate having an axis of rotation;

a clutch disc with friction linings;

a flywheel disposed adjacent to said clutch disc;

a clutch housing, in which said pressure plate and said clutch disc are at least partially disposed;

said friction linings being engageable by and disengageable from said pressure plate and said flywheel;

said friction linings being subject to wear as a result of repeated engagement with and disengagement from said pressure plate and said flywheel;

said friction linings including a first set of friction linings and a second set of friction linings;

said clutch disc further comprising resilient means disposed axially between said first set of friction linings and said second set of friction linings;

a release mechanism for engaging and disengaging said friction linings to said pressure plate and to said flywheel;

means for transmitting a movement and a force from said release mechanism to said pressure plate;

said means for transmitting comprising a membrane spring;

said membrane spring being located between said clutch housing and said pressure plate;

said pressure plate comprising a stop;

said means for transmitting having a first side and a second side, said second side being disposed opposite to said first side;

said stop contacts said means for transmitting on said first side;

said means for transmitting being supported by said clutch housing on said second side;

said release mechanism comprising actuating means, movable along a predetermined path, for engaging and disengaging said friction clutch;

means for transmitting a movement and a force from said release mechanism to said pressure plate;

said actuating means having means for adjusting the movement distance along said predetermined path of said actuating means;

guide means for guiding said means for transmitting;

said guide means guiding said means for transmitting upon said means for transmitting being in contact with said pressure plate;

said means for transmitting comprising means for permitting tracking the movement of said pressure plate by said means for transmitting upon the occurrence of a first force relationship between said pressure plate and said means for transmitting;

said means for permitting tracking the movement of said pressure plate comprising means for adjusting;

said means for adjusting including means for compensating for wear upon said friction linings to thereby maintain the force of said membrane spring upon said pressure plate;

said means for transmitting comprising means for stopping movement of said means for transmitting by frictionally engaging said means for transmitting against said guide means upon the occurrence of a second force relationship between said pressure plate and said means for transmitting;

said guide means having at least one surface, for stopping movement of said means for transmitting by frictionally engaging said means for transmitting against said guide means, being disposed substantially parallel to said axis of rotation for guiding said means for transmitting and for stopping movement of said means for transmitting by frictionally engaging said means for transmitting against said guide means;

said clutch housing comprising an inside surface;

said means for stopping movement of said means for transmitting comprising one portion disposed on said inside surface;

said one portion being disposed substantially parallel to said axis of rotation;

said one portion frictionally engaging said means for transmitting;

said means for stopping movement providing a fulcrum, upon the occurrence of the second force relationship, for said means for transmitting; and said fulcrum being disposed to provide a fulcrum about which forces of said release mechanism and said pressure plate act.

6. Motor vehicle friction clutch as claimed in claim 5, wherein:

said one portion is both substantially cylindrical and substantially circular;

said means for transmitting comprising a membrane disc;

said membrane disc being substantially annular;

said membrane disc having an outer radial surface being disposed to frictionally engage said one portion of said inside surface of said clutch housing;

said outer radial surface being disposed substantially parallel to said axis of rotation;

said membrane disc being disposed substantially perpendicular to said axis of rotation; and said outer radial surface of said membrane disc being disposed adjacent to said at least one portion, of said inside surface of said clutch housing, for frictionally engaging said outer radial surface against said at least one portion.

7. Motor vehicle friction clutch as claimed in claim 6, wherein:

said membrane disc has a radially inner part and a radially outer part;

said radially outer part of said membrane disc being disposed adjacent to said pressure plate;

said radially inner part of membrane disc comprising tabs;

said tabs extending radially inwardly in a direction away from said radially outer part;

said tabs of said membrane disc having radially inner ends;

said membrane spring having a radially inner portion and a radially outer portion;

said radially inner portion of said membrane spring comprising flexible tabs;

said flexible tabs extending radially inwardly in a direction away from said radially outer portion;

said flexible tabs of said membrane spring having radially inner ends;

said radially inner ends of said flexible tabs of said membrane spring being disposed adjacent to said radially inner ends of said tabs of said membrane disc;

said flexible tabs of said membrane spring being configured for biasing said tabs of said membrane disc to thereby exert a force on said pressure plate;

said radially inner part of said membrane disc contacting said release mechanism;

said radially outer part of said membrane disc being disposed adjacent to said one portion of said clutch housing;

said membrane disc being disposed between said membrane spring and said pressure plate;

said inside surface of said clutch housing comprising a first portion disposed perpendicular to the axis of rotation;

said first portion being disposed adjacent to said one portion;

said first portion being substantially annular in shape;

said friction clutch comprising a wire ring;

said wire ring being disposed circumferentially on said first portion of said inside surface of said clutch housing;

said wire ring being disposed between said first portion and said membrane spring;

said membrane spring being disposed between said wire ring and said membrane disc;

said pressure plate comprising energy storing devices;

each of said energy storing devices being configured to exert a force on said pressure plate opposite to the force exerted by said membrane spring on said pressure plate; and said release mechanism comprises a pull type clutch release mechanism.

* * * * *

UNITED STATES PATENT AND TRADEMARK OFFICE
CERTIFICATE OF CORRECTION

PATENT NO. : 5,636,721
DATED : June 10, 1997
INVENTOR(S) : Reinhold WEIDINGER

It is certified that error appears in the above-identified patent and that said Letters Patent is hereby corrected as shown below:

In column 8, line 9, after 'shoulders' insert --25.--.

In column 11, line 29, after '100', delete "and 1." and insert --to 1,--.

In column 12, line 9, after 'end' insert --30a--.

In column 13, line 37, after 'by the', delete "face" and insert --fact--.

In column 15, line 53, after 'releasing', delete "formed" and insert --force--.

Signed and Sealed this

Twenty-third Day of September, 1997

BRUCE LEHMAN

*Attest:*

*Attesting Officer*    *Commissioner of Patents and Trademarks*